US007817033B2

(12) United States Patent
Motoyama

(10) Patent No.: US 7,817,033 B2
(45) Date of Patent: Oct. 19, 2010

(54) VEHICLE LOCATING METHOD AND SYSTEM USING A MOBILE DEVICE

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 518 days.

(21) Appl. No.: 11/861,889

(22) Filed: Sep. 26, 2007

(65) Prior Publication Data

US 2009/0079591 A1 Mar. 26, 2009

(51) Int. Cl.
*G08B 1/00* (2006.01)
*G08B 1/08* (2006.01)
*G01C 21/00* (2006.01)

(52) U.S. Cl. ............................ 340/539.32; 340/539.13; 340/425.5; 701/213

(58) Field of Classification Search ....................... None
See application file for complete search history.

(56) References Cited

U.S. PATENT DOCUMENTS

| | | | |
|---|---|---|---|
| 5,313,201 A | 5/1994 | Ryan | |
| 5,543,802 A | 8/1996 | Villevieille et al. | |
| 5,925,091 A | 7/1999 | Ando | |
| 6,285,317 B1 | 9/2001 | Ong | |
| 6,360,169 B1 | 3/2002 | Dudaney | |
| 6,363,324 B1 * | 3/2002 | Hildebrant | 701/213 |
| 6,407,698 B1 | 6/2002 | Ayed | |
| 6,421,608 B1 | 7/2002 | Motoyama et al. | |
| 6,470,264 B2 | 10/2002 | Bide | |
| 6,489,921 B1 | 12/2002 | Wilkinson | |
| 6,496,205 B1 | 12/2002 | White et al. | |
| 6,580,999 B2 | 6/2003 | Maruyama et al. | |
| 6,650,999 B1 | 11/2003 | Brust et al. | |
| 6,725,138 B2 | 4/2004 | DeLuca et al. | |
| 6,738,712 B1 * | 5/2004 | Hildebrant | 701/213 |
| 6,763,226 B1 | 7/2004 | McZeal | |
| 6,857,016 B1 | 2/2005 | Motoyama et al. | |
| 6,961,659 B2 | 11/2005 | Motoyama et al. | |
| 7,158,079 B2 | 1/2007 | Motoyama | |
| 2002/0008614 A1 * | 1/2002 | Yeh et al. | 340/425.5 |
| 2002/0152028 A1 | 10/2002 | Motoyama et al. | |
| 2003/0020638 A1 * | 1/2003 | Sari et al. | 340/995 |
| 2003/0055560 A1 * | 3/2003 | Phillips | 701/213 |

(Continued)

FOREIGN PATENT DOCUMENTS

WO WO 98/55833 12/1998

OTHER PUBLICATIONS

U.S. Appl. No. 09/575,710, filed Jul. 25, 2000, Motoyama et al.

(Continued)

*Primary Examiner*—Julie Lieu
(74) *Attorney, Agent, or Firm*—Oblon, Spivak, McClelland, Maier & Neustadt, L.L.P.

(57) ABSTRACT

A system to transmit a location of a vehicle, including: a transmission system including, a first system unit configured to determine a current location using radio signals, a first memory unit storing a database that includes a list of one or more mobile devices, a processor configured to select one of the mobile devices from the database, and a first transmission unit configured to transmit the current location to the selected one of the mobile devices in response to an engine of the vehicle being shut off.

17 Claims, 14 Drawing Sheets

U.S. PATENT DOCUMENTS

| | | | | |
|---|---|---|---|---|
| 2003/0139878 | A1 | 7/2003 | DeLuca et al. | |
| 2004/0243307 | A1 | 12/2004 | Geelen | |
| 2005/0114015 | A1 | 5/2005 | Motoyama et al. | |
| 2005/0242989 | A1 | 11/2005 | Motoyama | |
| 2006/0041380 | A1* | 2/2006 | Motoyama et al. | 701/213 |
| 2007/0027951 | A1 | 2/2007 | Motoyama et al. | |
| 2007/0033267 | A1 | 2/2007 | Motoyama et al. | |
| 2007/0035441 | A1 | 2/2007 | Motoyama | |
| 2008/0167806 | A1* | 7/2008 | Wheeler et al. | 701/208 |

OTHER PUBLICATIONS

U.S. Appl. No. 11/861,875, filed Sep. 26, 2007, Motoyama.

* cited by examiner

| Mobile Device | Contact Info | Protocol | Encryption | Rule |
|---|---|---|---|---|
| A | Email Address | SMTP | Yes | Always send every 15 minutes |
| B | Cell Phone Number | Cellular | No | Send at Engine shutoff if #1 key is used |
| C | Unique identifier | Bluetooth or Wireless USB | No | Send if selected by user |

Fig. 14

VEHICLE LOCATING METHOD AND SYSTEM USING A MOBILE DEVICE

CROSS-REFERENCE TO RELATED APPLICATIONS

This application is related to the following U.S. applications: Ser. No. 09/575,702 filed on Jul. 12, 2000, now U.S. Pat. No. 6,421,608; Ser. No. 10/167,497 filed on Jun. 13, 2002; Ser. No. 09/575,710 filed on Jul. 25, 2000; Ser. No. 09/668,162 filed on Sep. 25, 2000, now U.S. Pat. No. 6,857,016; Ser. No. 10/636,561, filed on Aug. 8, 2003, now U.S. Pat. No. 7,158,079, Ser. No. 11/109,640, filed on Apr. 20, 2005, Ser. No. 11/586,537 filed on Oct. 26, 2006 and application Ser. No. 11/861,875, filed on Sep. 26, 2007. The contents of each of the above applications are incorporated herein by reference.

BACKGROUND OF THE INVENTION

1. Field of the Invention

The present invention relates generally to locating a vehicle using a mobile device, and more specifically to a vehicle sending location information to pre-designated mobile device with GPS capability when the engine of the vehicle is shut off.

2. Discussion of the Background

Today, many people have trouble remembering how to return to a particular location such as a common meeting place or where they parked their vehicle. This problem will most likely only get worse as the population ages and the aging generation face problems associated with memory loss. Forgetting where a vehicle is parked can be a serious problem in large parking lots such as malls, shopping centers, or amusement parks.

The Global Positioning System (GPS) is an example of a radio-based technology that is used to provide an earth based position using orbiting space satellites. As is well known in the art, currently there are twenty-four GPS space satellites in the GPS constellation orbiting in twelve-hour orbits, 20,200 kilometers above Earth configured such that there are six to eleven GPS satellites visible from any point on the Earth. GPS satellites broadcast specially coded signals that can be processed by GPS receivers. These GPS space satellites transmit on a primary and a secondary radio frequency, referred to as L1 and L2. The frequency of L1 is 1575.42 MHz (154 times the atomic clock) and the frequency of L2 is 1227.6 MHz (120 times the atomic clock). A typical GPS receiver retrieves GPS signals from at least three orbiting GPS space satellites and then calculates an earth based location, generally latitude and longitude coordinates. GPS signals from at least four orbiting GPS space satellites are necessary to calculate a three-dimensional earth based location, such as latitude, longitude and altitude. A GPS receiver calculates its location by correlating the signal delays from the GPS space satellites and combining the result with orbit-correction data sent by the satellites.

At present, there exist many different types of GPS receivers of varied capabilities which are commonly available for personal and governmental use. Typically, these GPS receivers are intended for navigational use in which the current calculated latitude and longitude location is displayed on some form of a geographic or topographical map. These systems are sometimes bulky and may require the user to manually program the system, such as entering a destination street address.

Because a typical user of a device intended to help the user remember how to return to a particular location is likely to be concerned about the size and complexity of the device, the device should be lightweight and simple to operate. Thus, a location device should have a simple user interface that is easy to operate with minimal or no user programming required. To this end, the location device should be able to utilize radio-based technology to automatically determine its current location. In addition, the location device should be carried by a user in order to be useful.

Thus, there exists an unmet need in the art for a lightweight and simple to use location device for registering and returning to a particular location.

SUMMARY OF THE INVENTION

In one aspect of the present invention, a system to transmit a location of a vehicle, includes: a transmission system including, a first system unit configured to determine a current location using radio signals, a first memory unit storing a database that includes a list of one or more mobile devices, a processor configured to select one of the mobile devices from the database, and a first transmission unit configured to transmit the current location to the selected one of the mobile devices in response to an engine of the vehicle being shut off.

Another aspect of the present invention involves a method transmitting a location of a vehicle, including: storing a first location in a memory unit in response to receiving a signal from a vehicle indicating that an engine of the vehicle is off; determining a second location; calculating a relative three-dimensional direction from the second location to the first location; and graphically representing a relative three-dimensional direction on a display device.

Another aspect of the present invention involves a computer readable storage medium, encoded with instructions which when executed by a computer causes the computer to implement a method for transmitting a location, including: determining a current location using radio signals; storing a database that includes a list of one or more mobile devices; selecting one of the mobile devices from the database; and transmitting the current location to the mobile device selected in the selecting step in response to an engine of the vehicle being shut off.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14 is an example of the database stored in the transmission unit.

DETAILED DESCRIPTION OF THE PREFERRED EMBODIMENTS

Figure 1:
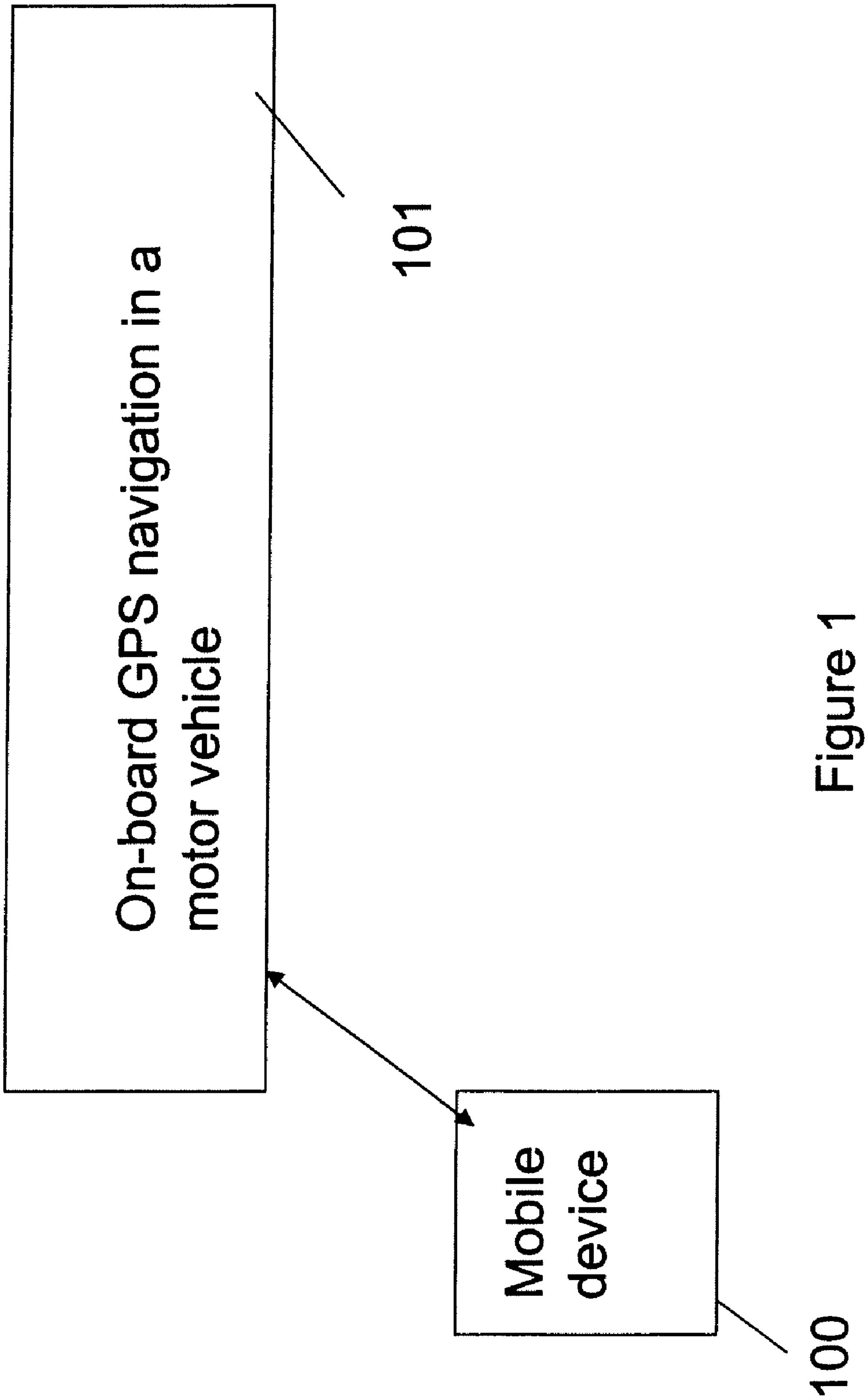
FIG. 1 shows a vehicle sending a message to a cell phone.

Referring now to the drawings, wherein like reference numerals designate identical or corresponding parts throughout the several views.

Referring to FIG. 1, a mobile device 100 receives a signal from a vehicle. When the engine of the vehicle is shut off, mobile device 100 obtains the location of the vehicle through the vehicle's navigation system. The vehicle's navigation system is configured to send the location information to a pre-designated mobile device. One or more mobile devices may be designated. Furthermore, the vehicle's navigation system may include a database of pre-designated mobile devices, wherein the database stores criteria determining which one or more than one pre-designated device is sent the location information. For example, the vehicle may detect, by recognizing a key used to start the vehicle, the presence of driver 1, and the vehicle's navigation system will communicate with only the mobile device of driver 1; the vehicle may detect the presence of driver 2, and the vehicle's navigation system will communicate with only the mobile device of driver 2; etc. Alternatively, a user can select which one or more mobile devices the vehicle's navigation system communicates with.

For example, in a situation where one driver drops off a vehicle and another driver picks up the vehicle, the other driver (who was not present when the vehicle was parked) needs the location of the vehicle. In this situation, the vehicle's navigation system will obtain the present location of the vehicle and transmit the present location of the vehicle to the other driver's cell phone in response to a command by the driver who dropped off the vehicle. Alternatively, the vehicle may be programmed to transmit its location to all mobile devices stored in the database, or may be programmed in accordance with preset conditions. For example, such pre-set conditions may be triggered by the date, or by the location of the vehicle, or both. In one embodiment, the vehicle may be programmed to transmit its location to mobile device A, B, and C when it is located in a predetermined position.

In some embodiments, the vehicle can detect which user is a predetermined distance from the engine shut off mechanism. Presumably, this allows the vehicle to determine who is driving the vehicle. The vehicle can use this information to determine which mobile device to transmit the location of vehicle to (i.e., the mobile device of the driver within a predetermined distance from the engine shut off mechanism). This mechanism can be developed by using wireless communication such as Bluetooth or Wireless USB.

The vehicle can include a database that manages and stores all the potential mobile communication devices that may be communicated with. The database can also include corresponding information used to determine how to contact the particular mobile device. In embodiments were cellular calls will be made by the vehicle to the mobile device, the cell phone number is stored in the database. Alternatively, an email address may be stored in the database. The database may include additional information such as unique identifiers, encryption protocols, and communications protocols.

The vehicle's navigation system can communicate with mobile device 100 through Bluetooth. However, other communication protocols may be used. For communications over a greater distance, the vehicle's communication system may make a cellular phone call, send an email, or a text message. The mobile device 100 will process the received data to extract the location of the vehicle.

Furthermore, the mobile device 100 may also function as an electronic key for the vehicle, which is described in copending application Ser. No. 11/861,875, filed on Sep. 26, 2007.

Mobile device 100 may be a cell phone, a personal digital assistant, or a device that has internet access with data and voice capability. Furthermore, mobile device 100 may be incorporated into other devices, such as watches and brackets as discussed below.

Figure 2:
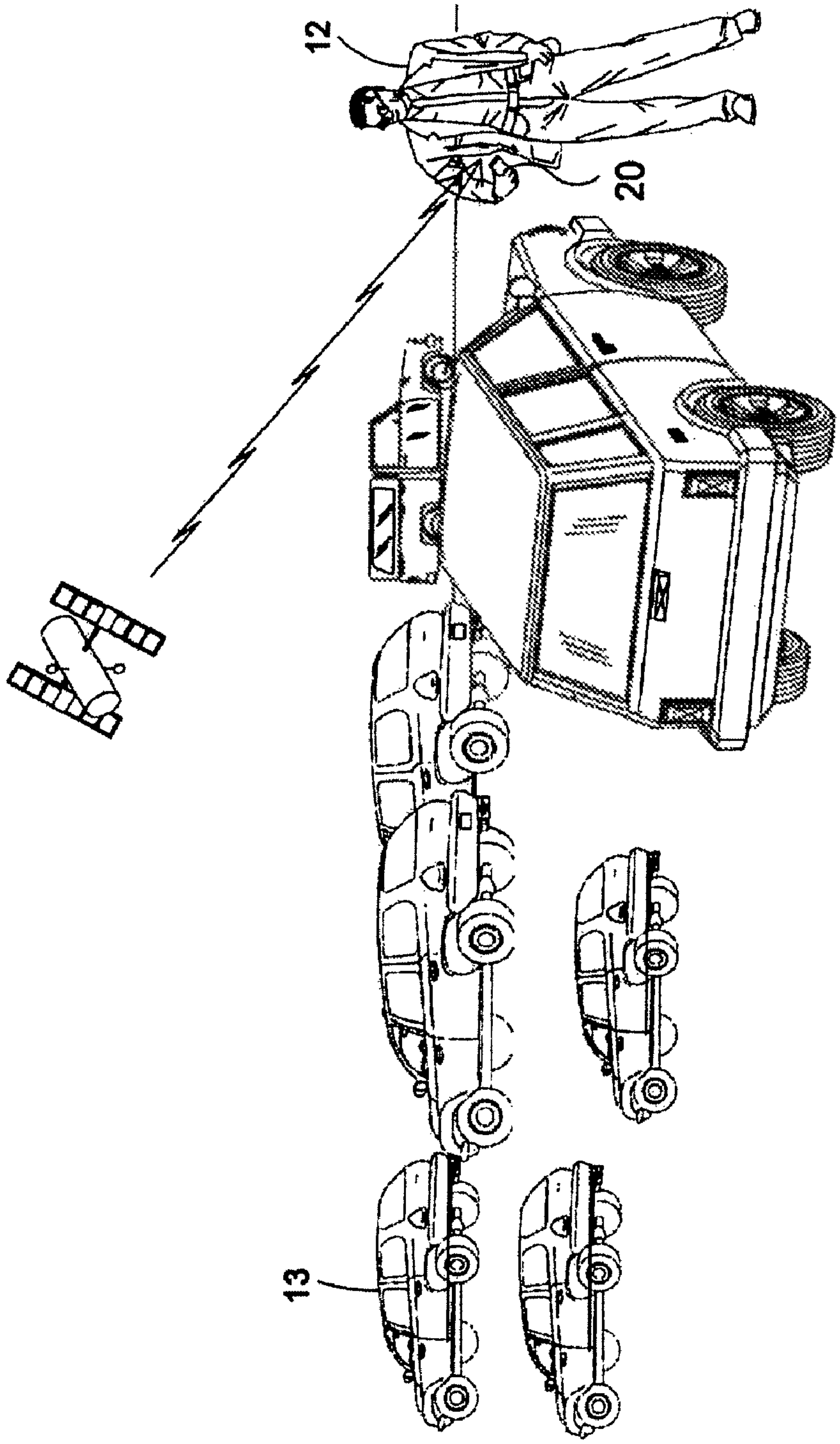
FIG. 2 shows a person looking for his vehicle in a parking lot.

Referring to FIG. 2, a person 12 is attempting to locate his vehicle 13 in a parking lot by using his mobile device 20, which has GPS capability. The mobile device has received the location of the car when the engine was shut off. The mobile phone uses its own GPS capabilities to determine a present location of the user. The mobile device computes the difference between the present location of the user and the location of the vehicle and displays directions to vehicle.

Figure 3:
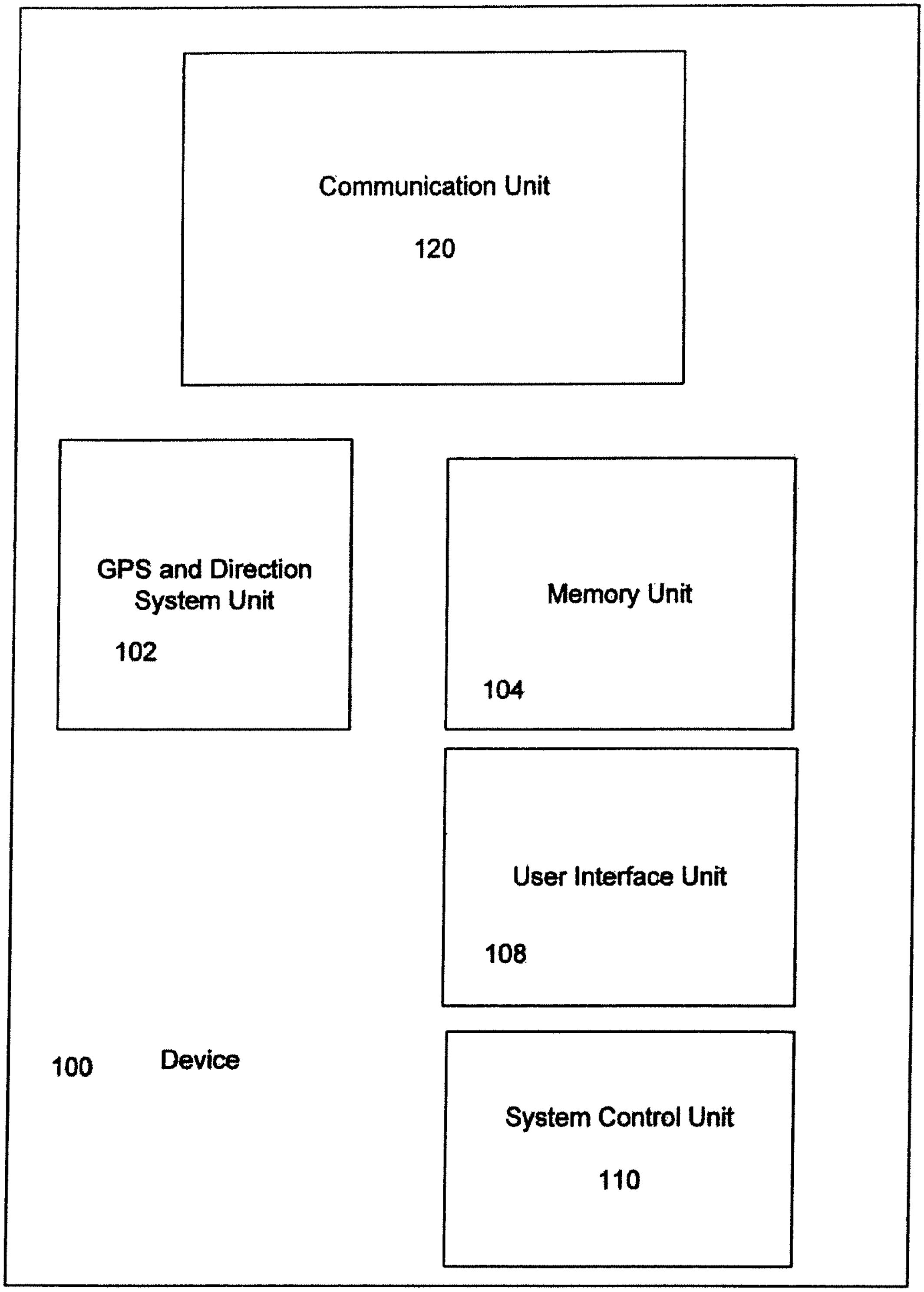
FIG. 3 is a block diagram of a location device according to an embodiment of the present invention.

Referring to FIG. 3, a block diagram of the mobile device according to an embodiment of the present invention is shown. The mobile device 100 contains five major subunits (102, 104, 108, 110, and 120). GPS and Direction System Unit 102 contains a radio frequency receiver along with a system bus interface, not described, and computer software. The radio frequency receiver receives radio frequency signals from radio-based transmitters (e.g., GPS satellites or ground stations). These radio frequency signals are used by the computer software to calculate a current three-dimensional location of the mobile device. Memory unit 104 contains the non-volatile and volatile memory that is required to operate the location device and its associated software. Memory Unit 104 may contain dynamic RAM and flash memory along with ROM. User Interface Unit 108 contains the control logic of the display unit and buttons. User interface 108 detects a pressing of a button on the location device 100, and identifies the function requested by user for the control unit 110 to perform. Control unit 110 includes a CPU which may be implemented as any type of processor including commercially available microprocessors from companies such as Intel, AMD, Motorola, Hitachi and NEC. The control unit 110 is configured to store a three-dimensional location ascertained from the GPS System and Direction Unit 102 into Memory Unit 104, to compute a relative three-dimensional direction of the current location of the mobile device relative to the stored location, and to communicate this directional information to User Interface Unit 108. In addition, the user interface unit 108 receives directional information and controls the display so as to indicate the direction to the car using display 202 of FIG. 4 (which is described later).

The mobile device 100 also includes a communication unit 120. Communication unit 120 interfaces with the vehicle to send and receive signals. For example, communication unit 120 receives a signal to record the current location of the vehicle into memory unit 104. For example, vehicle interface 120 can receive a signal to automatically record the position of the vehicle from a GPS system when the engine is stopped by pressing the stop button or switch in the vehicle. This embodiment automatically stores the location of the vehicle and relieves the user of having to remember to store there vehicle's location.

Figure 4:
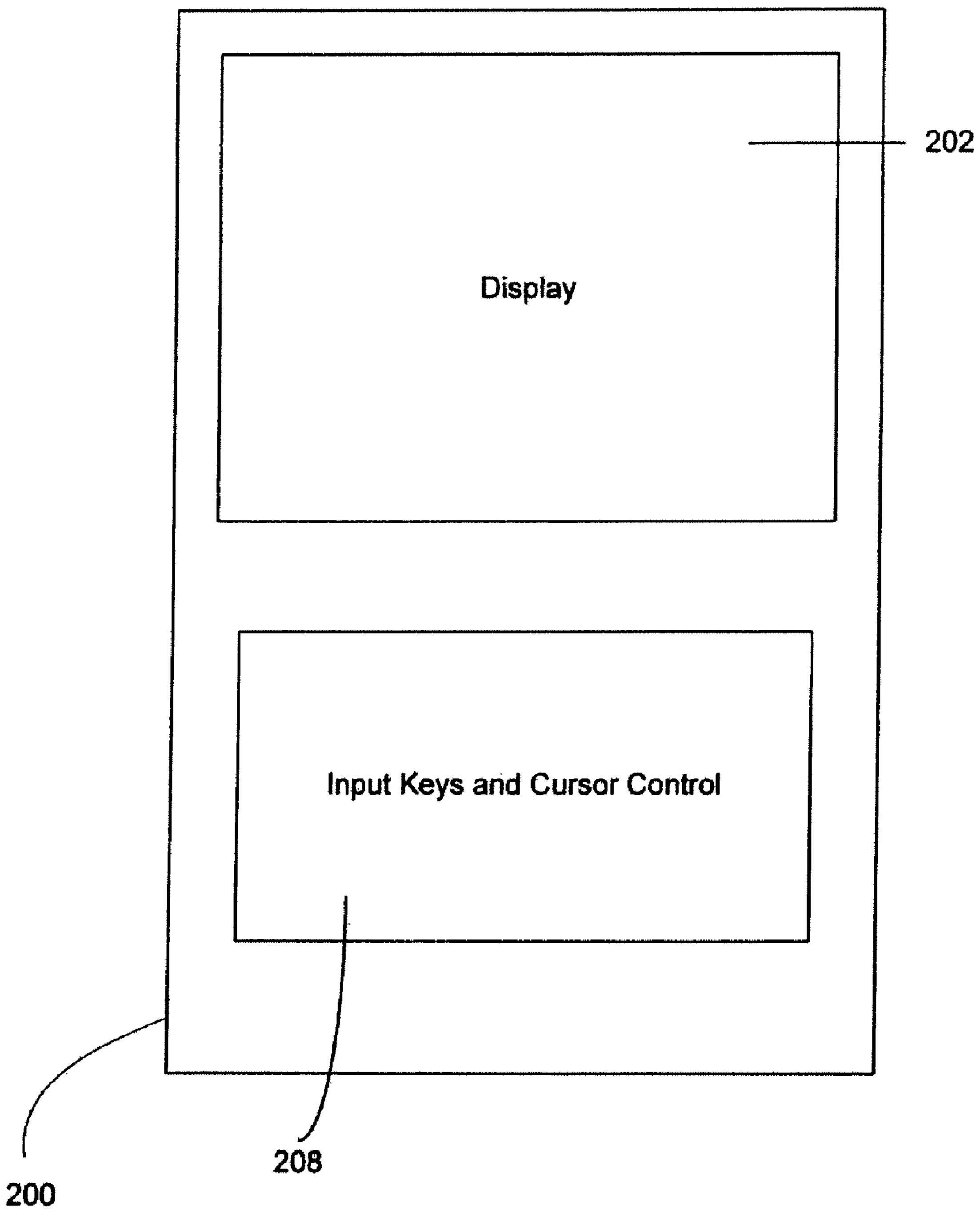
FIG. 4 is an example of a display of the location device.

FIG. 4 shows an example of a user interface 200 of the mobile device 100. The user interface 200 includes display 202 and input keys and cursor control 208. In response to one or more input keys 208 being pushed, a direction to the vehicle will be shown on display 202 In one embodiment, the display shows arrows that indicate a direction to the vehicle. Alternatively, direction such as north, south, etc. may be displayed. Furthermore, an indication that the vehicle is above or below the mobile device may be displayed.

In an alternative embodiment, a parking lot or other area may include transponders that send a signal to the vehicle identifying a location within the parking lot. For example, a transponder in a parking lot may send a signal to the vehicle indicating that the vehicle is in section A. The vehicle, at the time of engine shut off, will transmit a signal indicating the present location of vehicle is section A. Then, when the user is attempting to locate the vehicle, the mobile device will display section A. In another embodiment, the mobile device receives the section A information and the GPS coordinates from the vehicle and displays both section A and the direction to the vehicle to the user.

In additional embodiments of the present invention, the mobile device may include a button used to initiate registration of a location (i.e., the pressing of a button causes the present three-dimensional location to be stored).

To locate the vehicle, a user will press one or more keys 208 to activate a process of locating the vehicle. When the user presses one or more of keys 208, the current three-dimensional location of the mobile device is ascertained from the radio-based system unit 102 and stored in memory unit 104. Next, a relative three-dimensional direction is computed from the current location to the previously stored location of the vehicle. The relative three-dimensional direction is then displayed using directional indicators. Furthermore, a user can press one or more keys to initiate a recalculation and display of the relative three-dimensional direction from the current location to the location of the vehicle.

Optionally, the mobile device may be configured to periodically calculate and display, for some predetermined period of time after pressing the one or more keys, the relative three-dimensional direction from the current location to the registered location.

It is to be understood that FIGS. 3 and 4 illustrate just one of the many possible embodiments of the mobile device and that numerous variations are possible without departing from the scope of the present invention.

Figure 5:
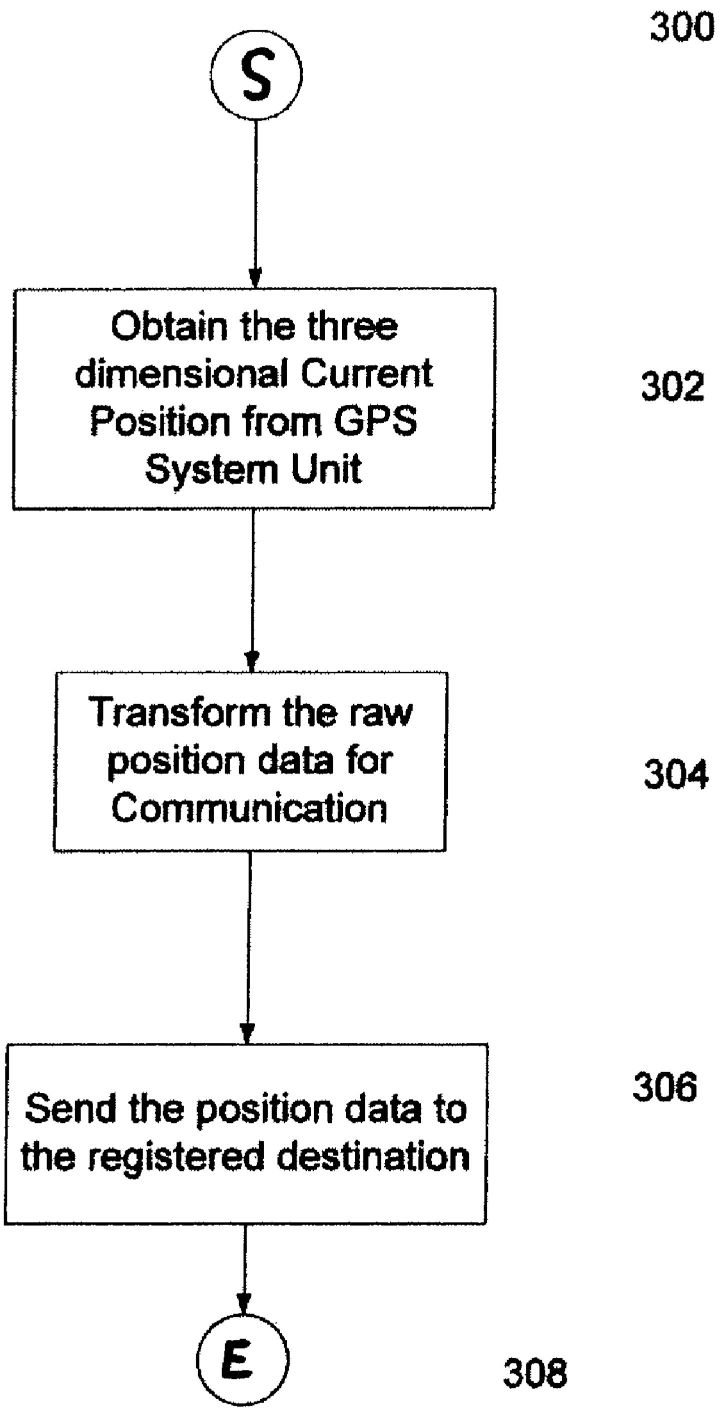
FIG. 5 is a flow chart illustrating the steps of a vehicle sending position information to a cell phone.

Referring to FIG. 5, a flowchart of the steps of a routine to send location information to the mobile device is shown. At step 300, the routine is called by a computer in the vehicle. A step 302, the three-dimensional location information is obtained from GPS unit of the vehicle. In step 304, the raw data is transformed to the data format convenient for the transmission to the mobile device. At step 306, the transformed position data, along with the necessary identification data, are created for transmission to the registered destination (i.e., registered mobile device).

Figure 6:
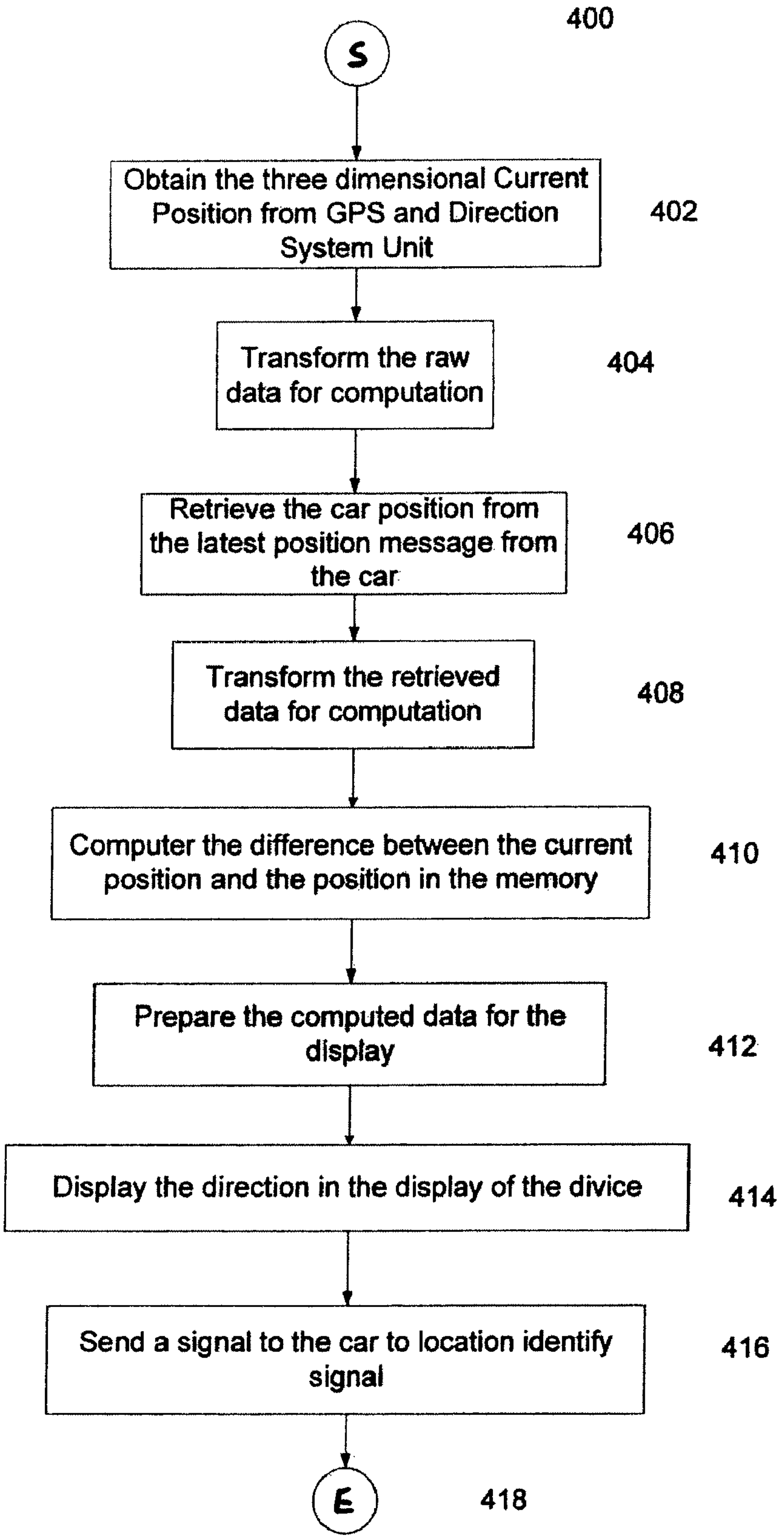
FIG. 6 is a flow chart illustrating the steps performed by a cell phone when the car location request is chosen.

Referring to FIG. 6, a flowchart of the steps for obtaining location information, computing the direction to the car, and displaying the location of the car on the mobile device. At step 400, the routine is called. At step 402, the location of the mobile device, along with the direction that the top of the mobile device is pointing, is obtained through the GPS and direction system unit 102. The system control unit 110 obtains the raw data and transforms the raw data for computation in step 404. The system control unit 110 then retrieves the latest vehicle position from the memory unit 104 at step 406, and transforms the retrieved vehicle position data for computation at step 408. At step 410, system control unit 410 computes the direction to be displayed. At step 412, system control unit 110 prepares the obtained direction data for the display and sends the data to the user interface unit 108 for display at step 414. At step 416, system control unit 108 sends a signal to the vehicle through communication unit 120 to identify the location of the vehicle. Such a signal may cause the vehicle to honk its horn, flash its lights, or perform some other function to distinguish the vehicle from the surrounding vehicles. For some vehicles, step 416 may not be feasible. In some cases, the vehicle may not respond when the distance is too far. In one exemplary embodiment, the entire process shown in FIG. 6 may be repeated at a pre-set interval. In another exemplary embodiment, the process shown in FIG. 6 is performed once, and the user must press another key on the control pad of the mobile device to repeat the request.

Figure 7:
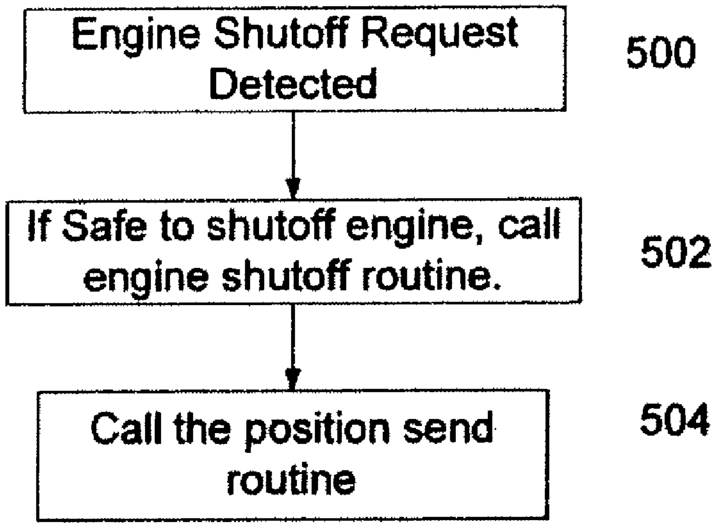
FIG. 7 is a flow chart illustrating the steps of an engine shutoff sequence of a vehicle.

FIG. 7 is flow chart of an exemplary process for an engine shutoff sequence of a vehicle. When engine shutoff is requested by the pressing of the start/off button or switch, the vehicle goes through the steps shown in FIG. 7. A step 500, the engine shutoff request is detected by the vehicle. In step 502, the computer of the vehicle calls an engine shutoff routine if the computer determines that it is safe to shutoff the engine. In step 504, a signal is sent to the mobile device that the engine is shut off and to record the present location sent by the vehicle. In an alternative embodiment, the vehicle does not send the location, but rather sends a command that causes the mobile device to obtain and record the location using its own GPS unit.

Figure 8:
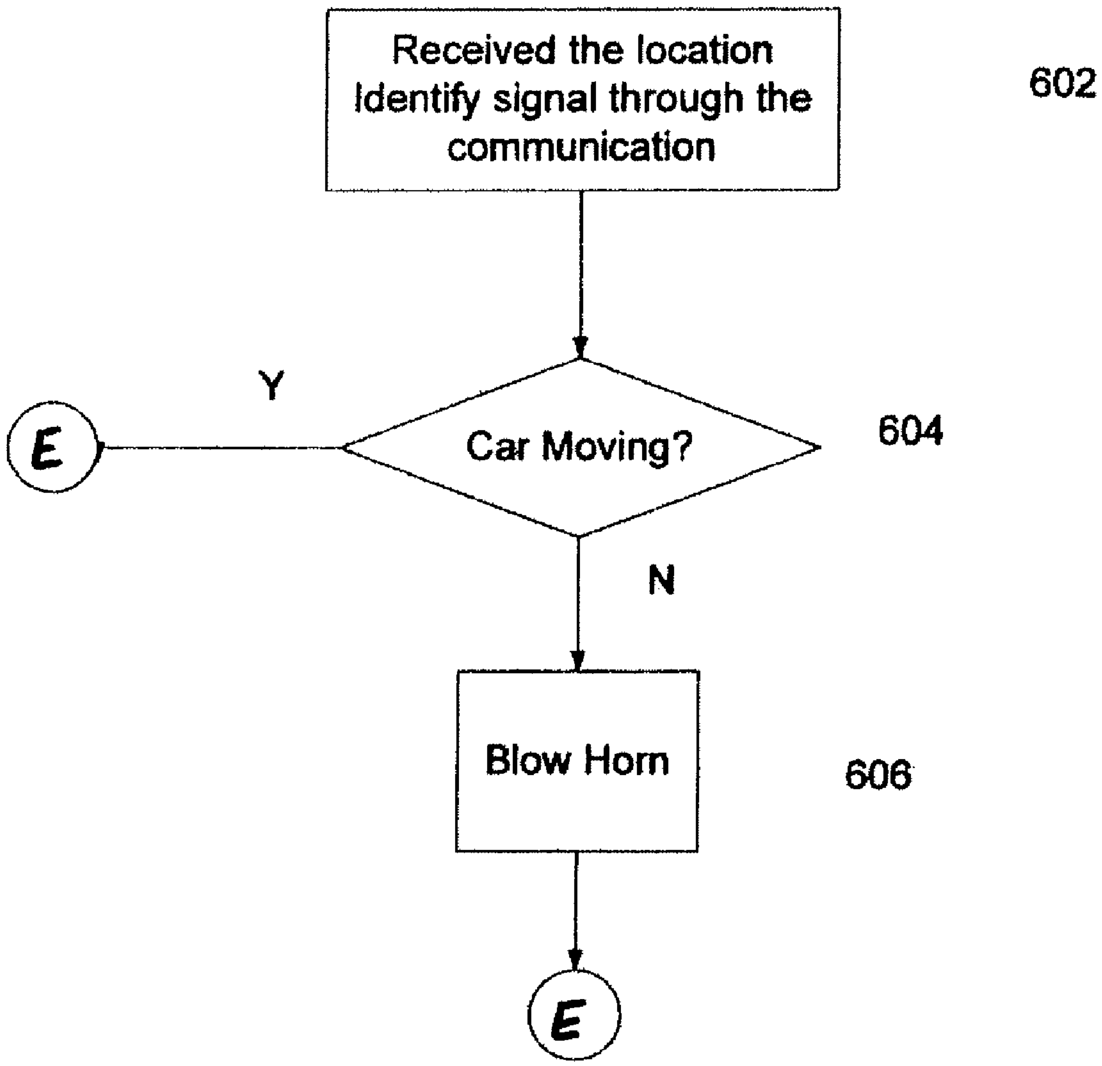
FIG. 8 is a flow chart illustrating the steps of a method when an identify signal is received by the vehicle.

Referring to FIG. 8, a flowchart of the steps performed by the vehicle step 416 is performed by the mobile device. At step 602, the vehicle receives the location identify signal sent by the mobile device in step 416. If the vehicle is moving (step 604), the received signal is ignored, and the routine ends (E). Otherwise, the vehicle blows the horn, flashes lights, or otherwise distinguishes itself from surrounding vehicles at step 606. In an alternative embodiment, if the vehicle is moving, the vehicle may send a message back to the mobile device informing the user of the mobile device that the vehicle is moving.

Figure 9:
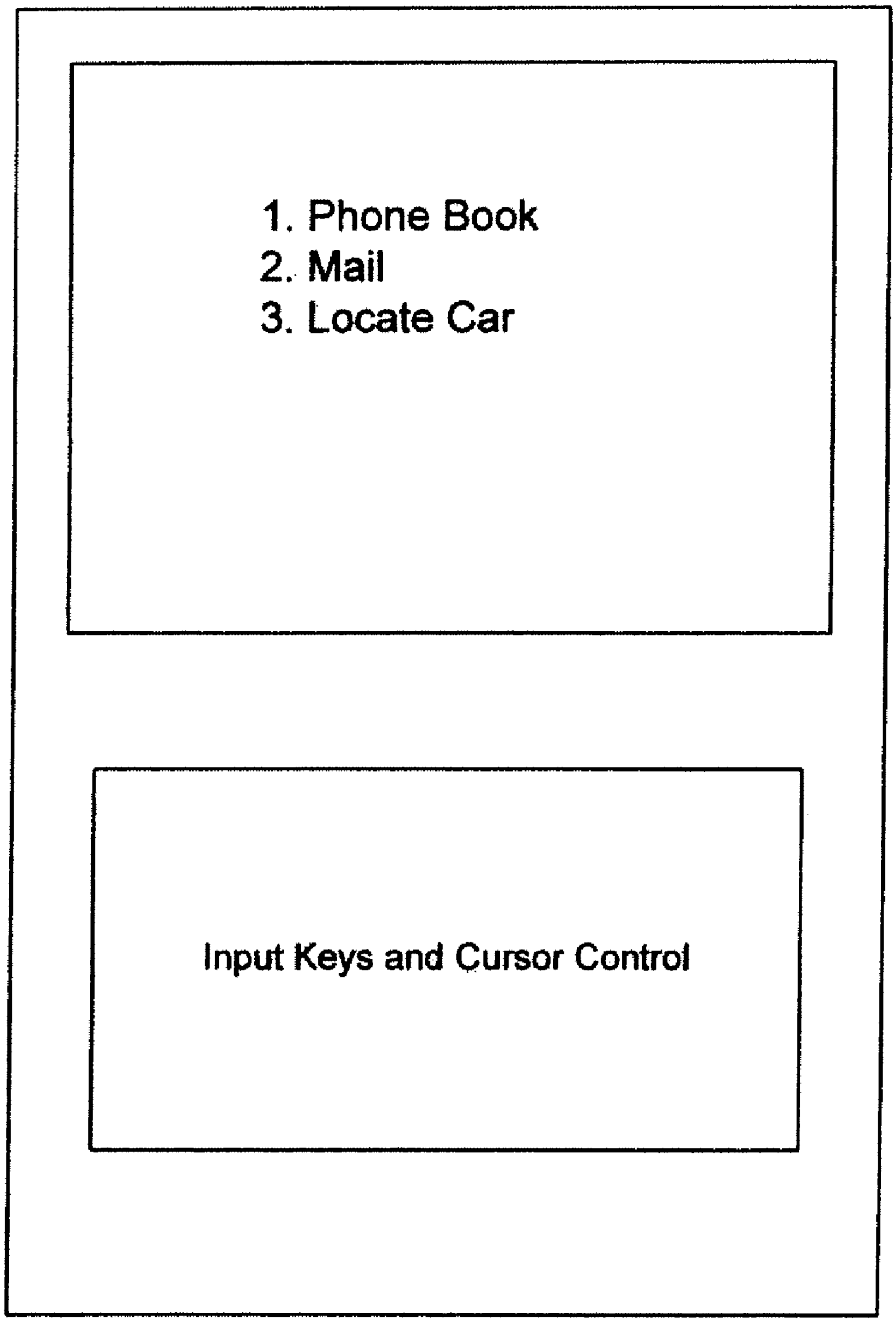
FIG. 9 shows an exemplary menu of the cell phone with the vehicle location.

FIG. 9 is an example of menu shown on a display of the mobile device. In this example, a user has the options of selecting phone book, mail, or locate car. By selecting locate car, the process shown in FIG. 6 is called. The selection may be made by using a touch screen or by using the input keys and cursor control.

Figure 10:
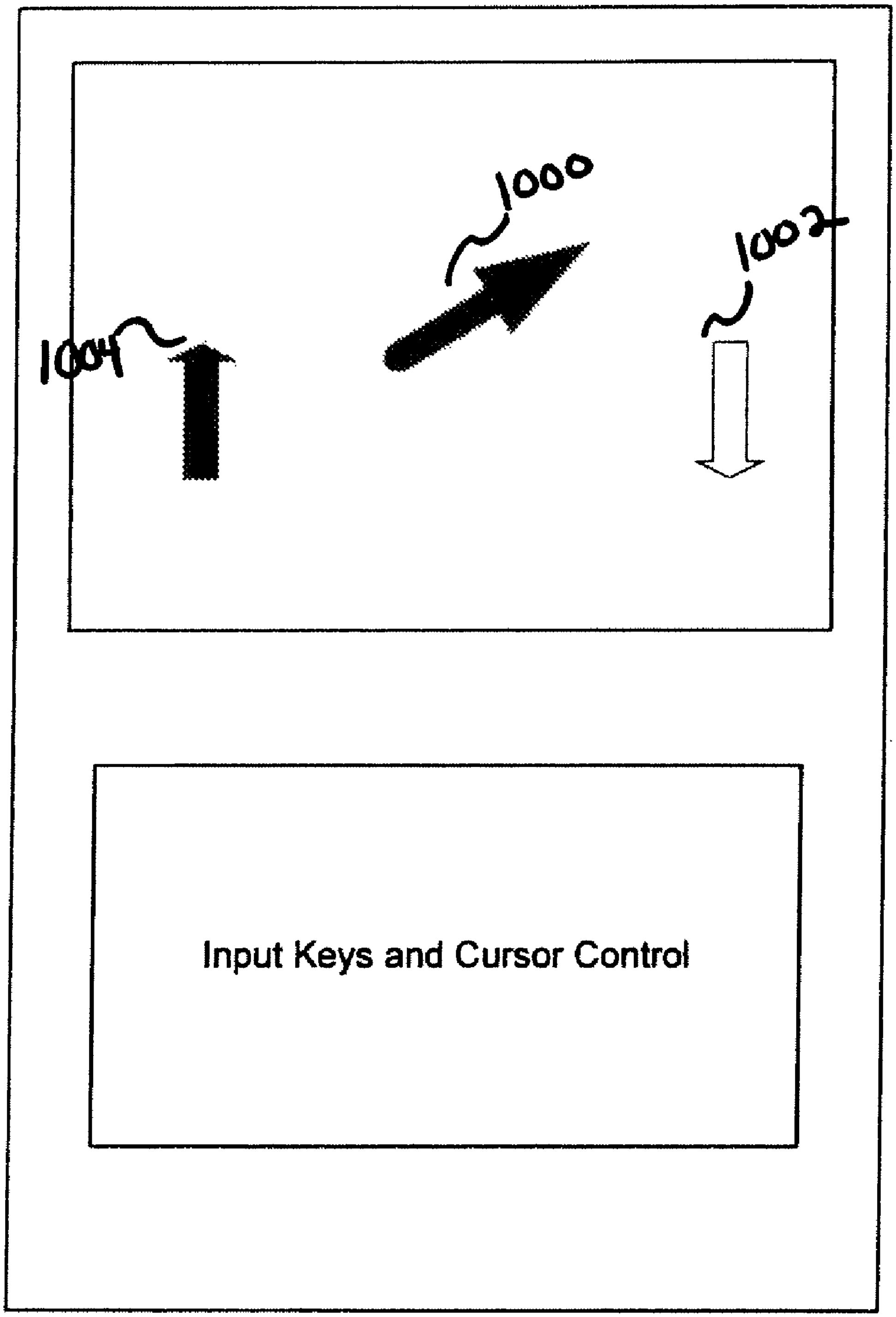
FIG. 10 shows a display of the cell phone, including up-down indicators.

FIG. 10 shows an example of how the mobile device can display an indication of the direction to the vehicle. Arrow 1000 point in the direction of the vehicle. Arrow 1002 indicates that the vehicle is below the mobile device (i.e., on a lower level of a parking garage). Arrow 10004 indicates that the vehicle is above the mobile device (i.e., on a higher level of a parking garage).

Figure 11:
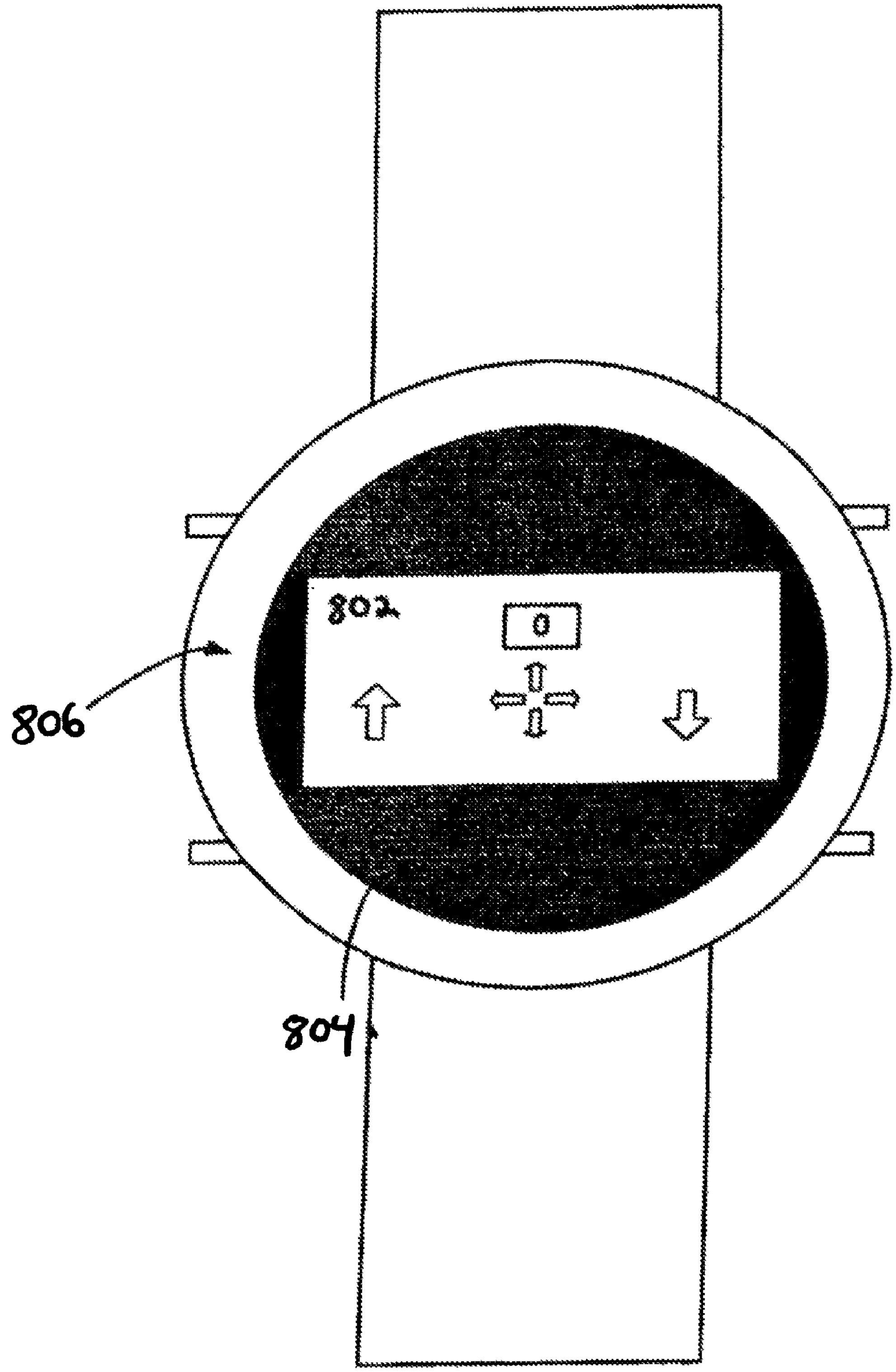
FIG. 11 is an example of another implementation of the present invention.

FIG. 11 is an example of an alternative embodiment of the present invention in a wrist device or in a watch. In the wrist device, an LED can be used for the direction indicators. In the watch, one of the buttons sticking out is a control button similar to the watches from Casio. One of the buttons is a mode switch button to switch from clock mode to return location mode and to show the display 802. Area 804 is a solar panel. The other buttons can control the different functions described in conjunction with FIGS. 5A-5C. Another button can be added to control the lighting of the display for night use.

Figure 12:
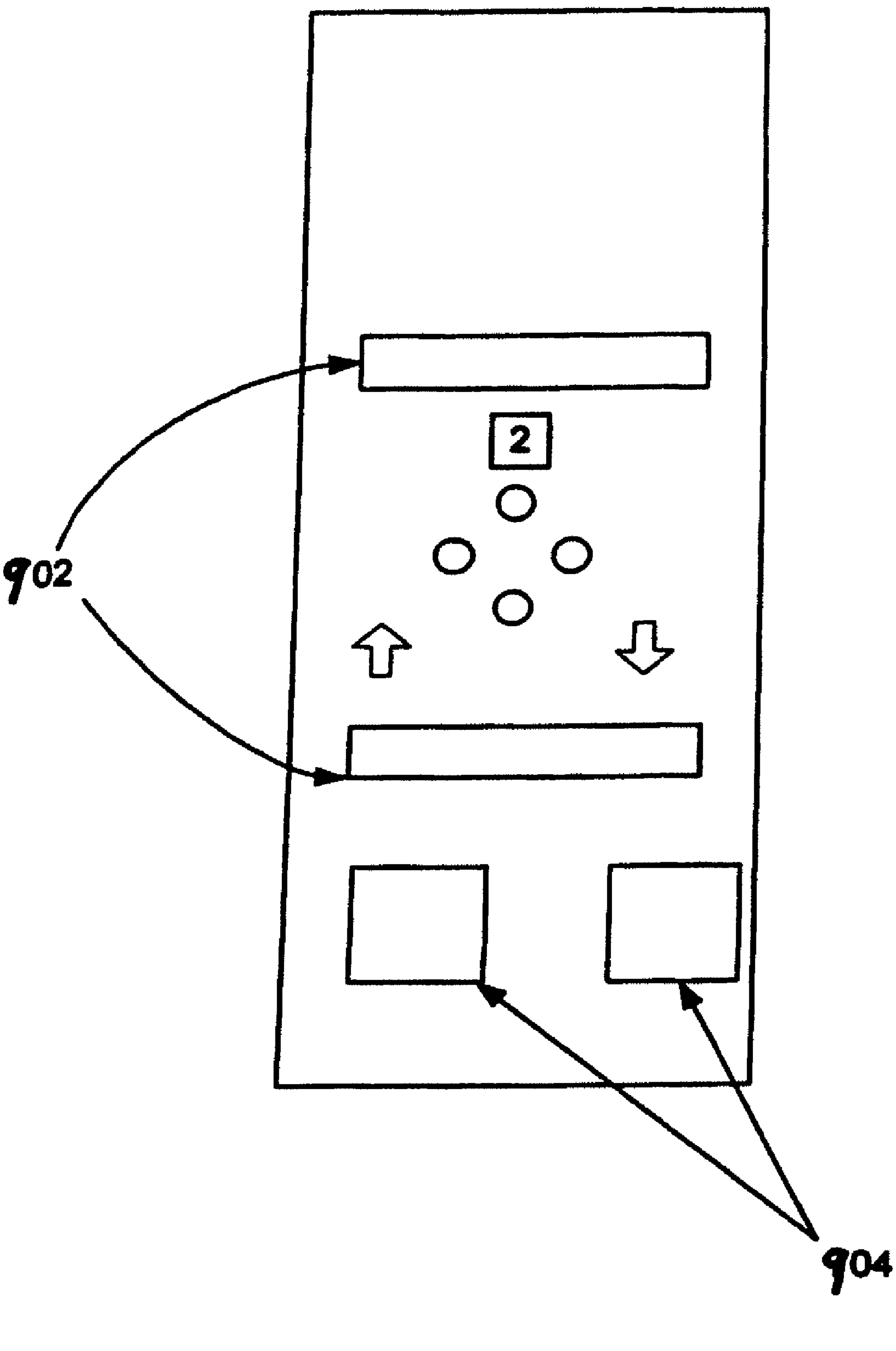
FIG. 12 is an example of another implementation of the present invention.

FIG. 12 is another example of an alternative embodiment of the present invention in a bracelet. Devices 902 are solar panels. Buttons 904 are two of the multiple buttons. Note that the implementation in a bracelet allows the use of a solar panel. In addition, an alternative design may hide the buttons and display into some decorative elements.

Embodiments of the present invention may also be embodied as a computer readable storage medium or memory for holding instructions programmed according to the teachings of the invention and for containing data structures, tables, records, or other data described herein. Examples of computer readable media are compact discs, DVDs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling device 100, for driving components of device 100 for implementing the invention, and for enabling device 100 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Figure 13:
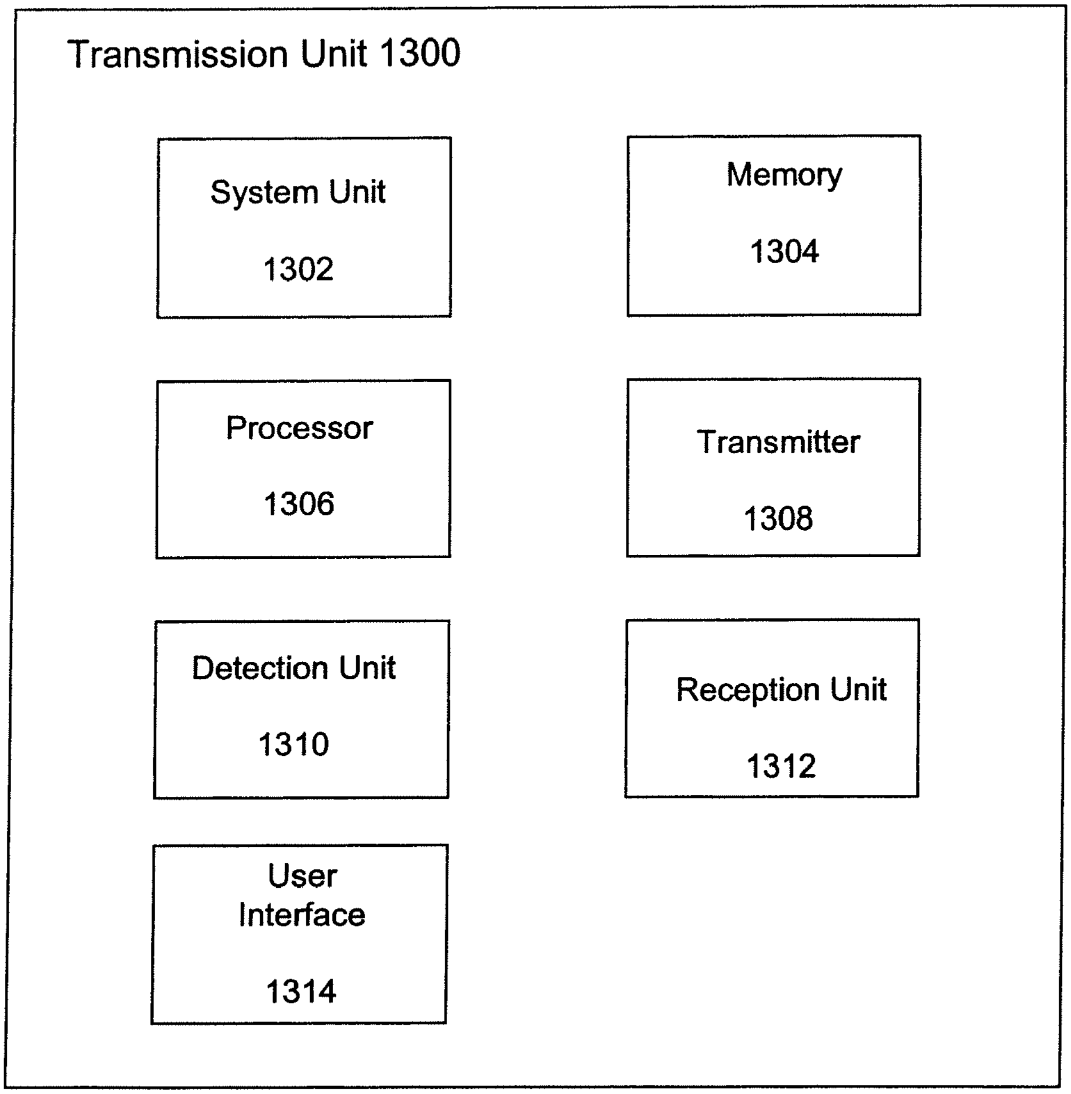
FIG. 13 is an example of a transmission unit in the vehicle.

FIG. 13 is an example of a transmission unit 1300, which is located in the vehicle. Transmission unit 1300 includes a system unit 1302, which is configured to determine a current location of the vehicle using radio signals. An example of system unit 1302 is a GPS device. The radio signals received by the system unit 1302 may be transmitted from Global Positioning Satellites, or from ground stations. The transmission system 1300 also includes memory unit 1304, which stores a database that includes a list of one or more mobile devices. The transmission system 1300 includes processor 1306, which is configured to select one of the mobile devices from the database. The transmission system 1300 includes transmitter 1308, which is configured to transmit the current location of the vehicle to the selected one of the mobile devices in response to an engine of the vehicle being shut off or other criteria. The transmission unit 1300 includes a detecting unit 1310 configured to determine which rule of a mobile device in the database is met.

Memory unit 1304 includes a database that stores rules that govern transmission unit 1300. Examples of the rules are discussed below with respect to FIG. 14. The rules generally control to which device the transmission unit 1300 communicates with and how frequently the communication occurs. However, a person of ordinary skill in the art would understand that other rules may be used.

The selected one or more of the mobile devices may be the mobile device determined to have met the condition in the rule described in the database. The transmitter 1308 may also be configured to transmit the current location of the vehicle to the selected one of the mobile devices determined to be the predetermined distance from the engine shutoff mechanism. The transmission unit 1300 also includes reception unit 1312, which is configured to receive a signal from one of the mobile devices. The signal causes the processor 1306 to send a command that causes a horn of the vehicle to blow or a light of the vehicle to flash. The transmission unit 1300 also includes a user interface, which is configured to allow a user to input commands and program the transmission unit. For example, the user interface allows the user to select which mobile device will be sent the vehicle's location, and to create rules that automatically control which mobile device is sent the vehicles location.

FIG. 14 shows an example of the database stored in memory 1304. The exemplary database shown in FIG. 14 includes information about 3 mobile devices (A, B, and C). These mobile devices may be a cell phone, PDA, laptop, or device that has internet access with data and voice capability. The database also includes at least one method of contacting the mobile device. The mobile device may be contacted through email, a cellular telephone call, or a wireless transmission (i.e., using Bluetooth or another wireless protocol) that includes a unique identifier of the mobile device. The exemplary database also includes the communication protocol that may be used when communicating with the mobile device. For email communications, SMTP may be used. For cellular telephone calls, any cellular protocol may be used. Appropriate cellular protocols are known to those of ordinary skill in the art and will not be described further. Further, Bluetooth or wireless USB may also be used. Further, the database includes a flag indicating whether encryption should be used when transmitting the vehicle location. The database also includes a rule, which may be used to determine if the vehicles location is transmitted to the corresponding mobile device. Only exemplary rules are shown in FIG. 14. For example, rules may include: always send the vehicle's location every 15 minutes to device A, send the vehicle's location to device B if the driver uses the key #1 at the time the engine of the vehicle is shutoff, and send the vehicle's location to device C if device C is selected by the user.

Numerous modifications and variations of the present invention are possible in light of the above teachings. It is therefore to be understood that within the scope of the appended claims, the invention may be practiced otherwise than as specifically described herein.

The invention claimed is:

1. A system to transmit a location of a vehicle, comprising:

a transmission unit including, a first system unit configured to determine a current location of the vehicle using radio signals, a first memory unit storing a database that includes a list of one or more mobile devices, a processor configured to select one of the mobile devices from the database, a transmitter configured to transmit the current location to the selected one of the mobile devices in response to an engine of the vehicle being shut off, and a detection unit configured to determine which mobile device was a predetermined distance from an engine shut off mechanism, wherein the selected one of the mobile devices is the mobile device determined to be the predetermined distance from the engine shut off mechanism, and the transmitter is configured to transmit the current location to the selected one of the mobile devices determined to be the predetermined distance from the engine shut off mechanism.

2. The system according to claim 1, wherein the radio signals comprise Global Positional System (GPS) orbiting space satellite signals.

3. The system according to claim 1, wherein the transmission unit further comprises:

a reception unit configured to receive a signal from one of the mobile devices, said signal causing the first processor to send a command that causes a horn of the vehicle to sound or a light of the vehicle to flash.

4. The system according to claim 1, wherein the database stores an identifier for each of the one or more mobile devices, information used to contact the one or more mobile devices, and information used to determine which of the one or more mobile device is to receive the current location.

5. The system according to claim 4, wherein the processor is configured to process the information used to determine which of the one or more mobile devices is to receive the current location to determine the selected one or more mobile devices.

6. The system of claim 1, further comprising:

the selected one of the mobile communication devices, wherein the selected one of the mobile communication devices includes, a second system unit configured to determine a location of the mobile communication device using radio signals, a user interface having a display and a button, a second memory unit configured to store the location of the mobile communication device, a reception unit configured to receive the current location sent by the first transmission unit, a second processor configured to store the location received by the reception unit in the second memory unit, and a computational unit configured to interact with the button, wherein the computational unit retrieves the current location of the mobile communication device from the second system unit and calculates a relative three-dimensional direction from the current location of the mobile communication device to the current location sent by the first transmission unit, wherein the relative three-dimensional direction is graphically represented on the display area of the user interface.

7. The system of claim 6, wherein the mobile communication device further comprises:

a second transmitter configured to transmit a signal causing the first processor to blew sound a horn of the vehicle or flash a light of the vehicle.

8. A method of transmitting location information, comprising:

determining a current location of a vehicle using radio signals;

storing a database that includes a list of one or more mobile devices;

determining which mobile device was a predetermined distance from an engine shut off mechanism;

selecting one of the mobile devices from the database determined to be the predetermined distance from the engine shut off mechanism; and transmitting the current location to the mobile device determined to be the predetermined distance from the engine shut off mechanism in response to an engine of the vehicle being shut off.

9. The method according to claim 8, wherein the determining includes using Global Positional System (GPS) orbiting space satellite signals.

10. The method according to claim 8, further comprising:

receiving a signal from one of the mobile devices, said signal including a command to cause a horn of the vehicle to sound or a light of the vehicle to flash.

11. The method according to claim 8, further comprising:

storing, in the database, an identifier for each of the one or more mobile devices, information used to contact the one or more mobile devices, and information used to determine which of the one or more mobile devices is to receive the current location.

12. The method according to 11, wherein the selecting comprises:

accessing the database to obtain the information used to determine which of the one or more mobile devices is to receive the current location; and selecting the one of the mobile devices from the database in accordance with the information used to determine which of the one or more mobile devices is to receive the current location.

13. The method of claim 8, further comprising:

determining a location of the mobile communication device using radio signals, receiving the current location sent by the transmitting step;

storing the current location;

calculating a relative three-dimensional direction from the location of the mobile communication device to the current location sent by the transmitting step; and graphically representing the relative three-dimensional direction on a display.

14. The method of claim 8, further comprising:

transmitting, by the mobile communication device, a signal including a command to cause a horn of the vehicle to sound or a light of the vehicle to flash.

15. A non-transitory computer readable storage medium, encoded with instructions which when executed by a computer causes the computer to implement a method for transmitting a location, comprising:

determining a current location using radio signals;

storing a database that includes a list of one or more mobile devices;

determining which mobile device was a predetermined distance from an engine shut off mechanism;

selecting one of the mobile devices from the database determined to be the predetermined distance from the engine shut off mechanism; and transmitting the current location to the mobile device determined to be the predetermined distance from the engine shut off mechanism in response to an engine of the vehicle being shut off.

16. The non-transitory computer readable storage medium according to claim 15, wherein the method further comprises:

storing, in the database, an identifier for each of the one or more mobile devices, information used to contact the one or more mobile devices, and information used to determine which of the one or more mobile devices is to receive the current location.

17. The non-transitory computer readable storage medium according to claim 16, wherein the method further comprises:

accessing the database to obtain the information used to determine which of the one or more mobile devices is to receive the current location; and selecting the one of the mobile devices from the database in accordance with the information used to determine which of the one or more mobile devices is to receive the current location.

* * * * *